United States Patent [19]

Garapon et al.

[11] Patent Number: 4,997,910
[45] Date of Patent: Mar. 5, 1991

[54] PROCESS FOR CONDENSING AT LEAST ONE EPOXIDE ON AT LEAST ONE CYCLIC ANHYDRIDE IN THE PRESENCE OF A TITANIUM-BASED CATALYST

[75] Inventors: Jacques Garapon, Lyon; Rémi Touet, Saint Egreve; Catherine Huet, Chalon Sur Saone; Bernard Damin, Oullins, all of France

[73] Assignees: Institut Francais du Petrole, Rueil-Malmaison; L'Air Liquide Societe Anonyme Pour L'Etude et L'Exploitation Des Procedes Georges Claude, Paris; Elf France, Courbevoie, all of France

[21] Appl. No.: 447,477

[22] Filed: Dec. 7, 1989

[30] Foreign Application Priority Data

Dec. 7, 1988 [FR] France .................................. 88 16190

[51] Int. Cl.$^5$ ........................ C08G 63/42; C08G 63/58
[52] U.S. Cl. ....................................... 528/366; 528/365
[58] Field of Search ........................ 528/297, 365, 366

[56] References Cited

U.S. PATENT DOCUMENTS

| | | | |
|---|---|---|---|
| 3,337,511 | 8/1967 | Matsuura et al. | 528/366 |
| 4,116,944 | 9/1978 | Hill et al. | 528/366 |
| 4,125,524 | 11/1978 | Hill et al. | 528/366 |
| 4,526,957 | 7/1985 | Matz | 528/366 |
| 4,565,845 | 1/1986 | Inoue et al. | 528/297 X |

OTHER PUBLICATIONS

Mimoun, H. et al., "Novel Unusually Stable Peroxotitanium (IV) Compounds, Molecular and Crystal Structure of Peroxobis(Picolinato)(Hexamethylphosphoric Triamide)Titanium(IV)", Inorg. Chem., vol. 21, pp. 1303-1306 (1982).

Primary Examiner—Earl Nielsen
Attorney, Agent, or Firm—Millen, White & Zelano

[57] ABSTRACT

The invention relates to a process for condensing at least one epoxide on at least one cyclic anhydride of a dicarboxylic acid in the presence of a catalyst consisting of at least one titanium peroxidic complex of the peroxo type of the A form

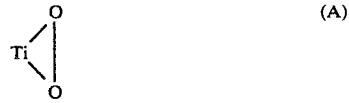

Said process allows to obtain a perfectly alternate polyester.

10 Claims, 2 Drawing Sheets

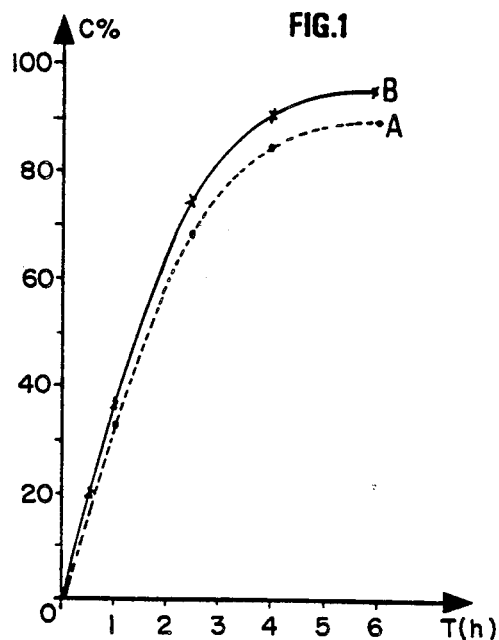
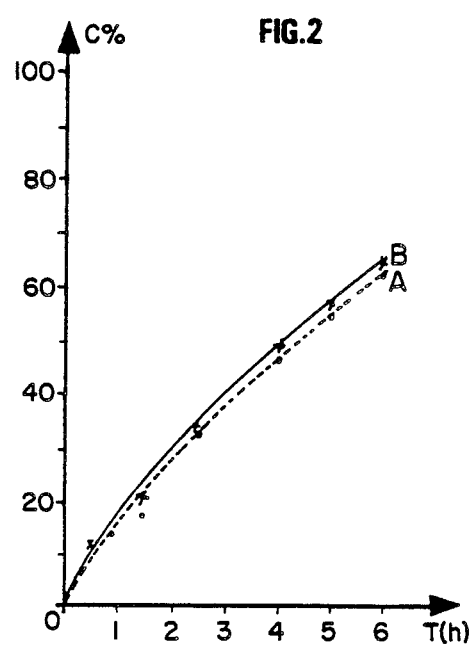
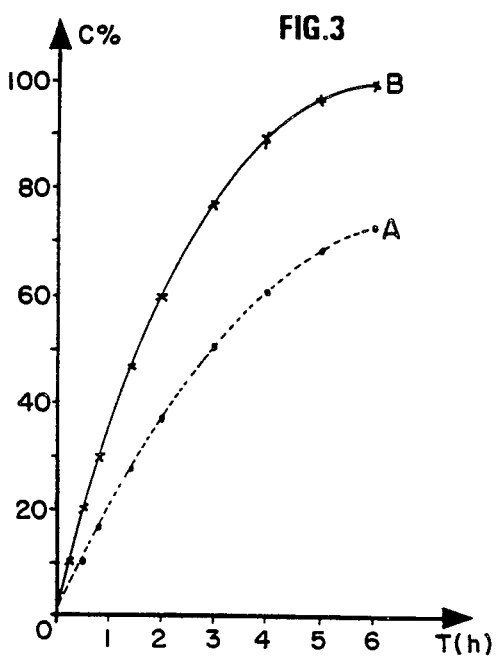
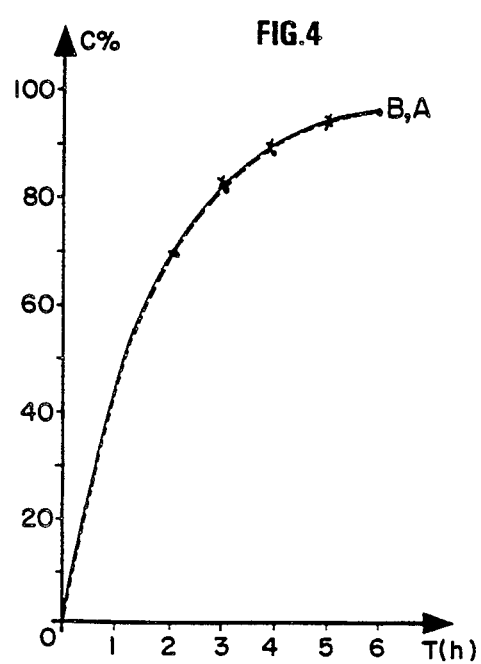

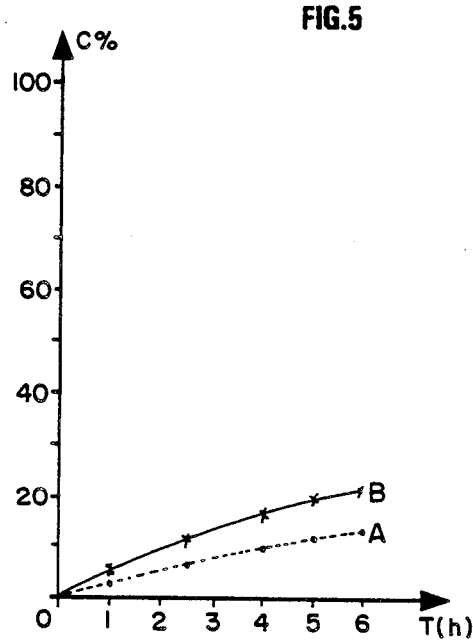
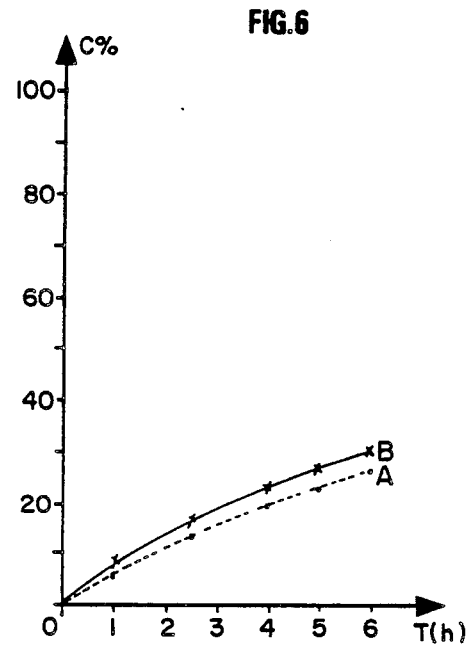
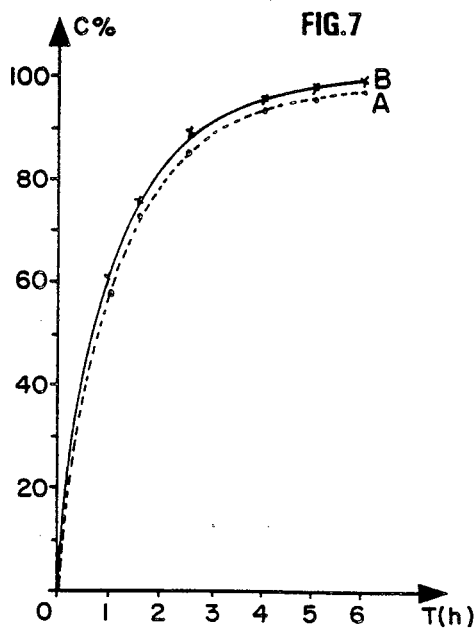
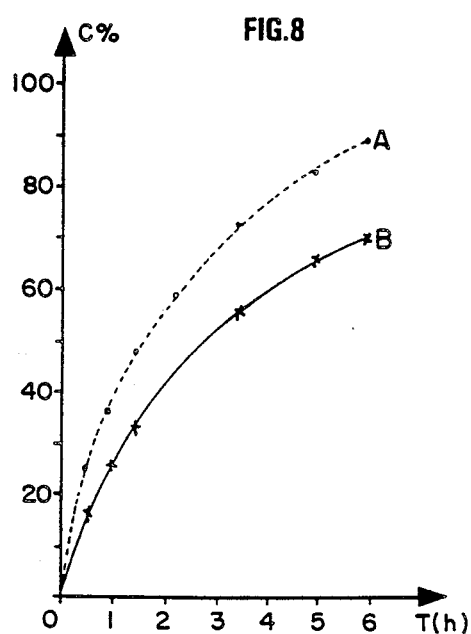

PROCESS FOR CONDENSING AT LEAST ONE EPOXIDE ON AT LEAST ONE CYCLIC ANHYDRIDE IN THE PRESENCE OF A TITANIUM-BASED CATALYST

OBJECT OF THE INVENTION

The present invention relates to a process for condensing at least one epoxide on at least one cyclic anhydride of a dicarboxylic acid in the presence of a catalyst consisting of at least one titanium peroxidic complex of the peroxo type.

The object of the present invention is also a process for producing saturated or unsaturated alternate polyesters by condensing at least one epoxide on at least one cyclic anhydride of a dicarboxylic acid.

This type of polyesterification is different from the conventional process implementing a dihydroxyl compound (or diol) and an anhydride or a dicarboxylic acid, particularly by the fact that the polycondensation temperature does generally not exceed 150° C. and especially by the fact that no volatile matter is released during the reaction.

BACKGROUND OF THE INVENTION

The condensation between an epoxide or an epoxide derivative and a cyclic anhydride has given rise to numerous works which have for example been summarized by LUSTON and VASS (Advances in Polymer Sciences 1984, Vol. 56, p. 91 and following pages) or by ISHII and SAKAI (Ring opening polymerisation, p. 13 and following pages, published by K. C. FRISCH and S. REEGEN, MARCEL DEKKER 1969).

An examination of the cited works shows that the main problem posed by this type of condensation is the homopolymerisation of the epoxide which causes the obtaining of a sequent polyether-polyester or of polymer mixtures, particularly when Lewis acids ($TiCl_4$, $BF_3$, etc) are used as condensation catalysts. In order to overcome this drawback, it has been suggested in prior art to utilize anionic or coordination catalysts.

FISHER (Journal of Polymer Science 1960, Vol. 44, p. 155 and following pages) has shown that the use of a tertiary amine as a condensation catalyst of an anhydride on an epoxide allows to obtain an alternate condensation.

However, this type of catalyst is ineffective as far as maleic anhydride is concerned, probably because of the complex side reactions with the amines at the level of the double maleic bond. Other types of anionic catalysts such as alkali metal salts or tetra-alkylammonium salts have also been utilized. For example WADILL, MILLIGAN and PEPPEL (Industrial and Engineering Chemistry, Product Research and Development 1964, Vol. 3, Part 1, p. 53 and following pages) describe the use of lithium chloride in the presence of protonic materials at 150° C. These authors suggest that the homopolymerisation of epoxide is part of their process. As an example of a coordination catalyst, the dialkyl-zinc mentioned by INOUE et al. (Makromolekulare Chemie 1969, Vol. 126, p. 250 and following pages) can be cited; this type of catalyst can actually only be applied, according to INOUE et al., to phthalic anhydride. U.S. Pat. No. 4,565,845 describes the use of a catalytic system comprising an aluminium porphyrin which allows to obtain a polyester with a rather good alternation between the unit from the anhydride and that from the epoxide.

Transition metal-based catalysts have also been previously described. Thus, FISCHER (cited above) observes a partial homopolymerisation of the glycidic epoxide during its polycondensation with the phthalic anhydride in the presence of tetrabutyl titanate.

U.S. Pat. No. 3,546,176 claims the use of tetrabutyl titanate for producing unsaturated polyesters from anhydrides of unsaturated acids and from epoxides. However, as confirmed by a test carried out by the applicant and described hereafter, this catalyst does not allow to obtain a good alternation of the units from the anhydride and from the epoxide.

DESCRIPTION OF THE INVENTION

It has been surprisingly discovered that it is possible to obtain, with a high conversion of the original materials, an alternate polyester, by the condensation of at least one epoxide on at least one cyclic anhydride of a dicarboxylic acid, by using as a condensation catalyst at least one titanium peroxidic complex. In the present invention, a titanium peroxidic complex designates a complex of the peroxo type, of the A form, wherein the titanium is linked to a molecule of oxygen carrying two negative charges ($O_2{}^{2-}$):

(A)

The peroxidic complexes which are used in the present invention are preferably those corresponding to one of the following general formulas (I) to (III):

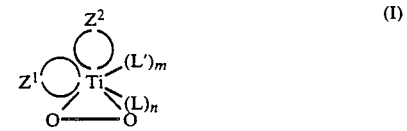

(I)

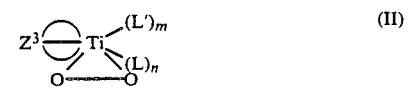

(II)

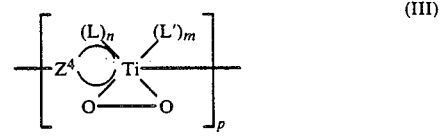

(III)

in which n and m are, independently from one another, zero or one, p is a number greater than or equal to 2, $Z^1$ and $Z^2$, identical or different, represent each an anion or a bidentate mono-anionic group, $Z^3$ represents a di-anion or a tri- or tetradentate di-anionic group, $Z^4$ represents a bi- or tridentate di-anionic group, L and L, identical or different, represent each a molecule of water, an alcohol or a monodentate or bidentate electrodonor-type ligand.

In the complexes of the general formulas (I) to (III) which have been cited above:

$Z^1$ and $Z^2$, identical or different, are preferably each selected from the group formed by the nitrogenated heterocyclic mono or poly-aromatic compounds, having at least one carboxylic group vicinal to nitrogen, possibly substituted by at least one Y group selected from the group formed by an alkyl (for example $C_1$ to $C_{18}$), an aryl (for example $C_6$ to $C_{18}$), an alkyloxy- (for example $C_1$ to $C_{18}$), an aryloxy- (for example $C_6$ to $C_{18}$), a nitro, a carboxylate (for example $C_2$ to $C_{18}$), a carboxyamide (for example $C_1$ to $C_{18}$), a hydroxyl and a halogen (chlorine, bromine, fluorine or iodine) group, hydroxy-8 quinoline, hydroxy-5 or -8 quinoxaline, hydroxy-8 quinazoline, hydroxy-8 cinnoline, hydroxy-4 or -5 acridine, hydroxy-1, -4, -6 or -9 phenazine and the derivatives of these nitrogenated heterocyclic hydroxyl compounds substituted by at least one T group selected from the group formed by an alkyl (for example $C_1$ to $C_{18}$), an aryl (for example $C_6$ to $C_{18}$), an alkyloxy- (for example $C_1$ to $C_{18}$), an aryloxy- (for example $C_6$ to $C_{18}$), a nitro, carboxylate (for example $C_2$ to $C_{18}$), a carboxyamide (for example $C_1$ to $C_{18}$) and a halogen (chlorine, bromine, fluorine or iodine) group:

$Z^3$ and $Z^4$, identical or different, are preferably each a nitrogenated heterocyclic mono or poly-aromatic compound, having at least two carboxylic groups among which at least one is vicinal to an atom of nitrogen, possibly substituted by at least one Y group such as defined above;

L and L, identical or different, represent each a molecule of water, an alcohol or a ligand preferably selected from the group formed by an aromatic amine, a linear or cyclic amide, a phosphoramide, an aliphatic or aromatic amine oxide, a phosphine, arsine or stibnite oxide, a 1,3-diketonic compound and a hydroxy-aromatic compound comprising a ketonic or an aldehydic group in ortho of the hydroxyl group.

When one or several Y groups are present in the molecule, they can occupy one or several of any position of the distinct or attached aromatic rings. Thus, for example, in the case of the complexes with the general formula (I), $Z^1$ and $Z^2$ can have the following representative formula:

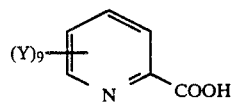

in which q is zero or an integer, for example an integer from 1 to 3. The following non limitative examples of such mono or poly-aromatic compounds can be cited: pyridine 2-carboxylic (or picolinic) acid, pyrazine 2- or 6-carboxylic acid, quinoline 2-carboxylic acid, isoquinoline 1- or 3-carboxylic acid and the 3-, 4-, 5- and 6-chloro, bromo, nitro, hydroxy, methyl, ethyl, propyl, butyl, phenyl and benzyl picolinic acids.

In the case of complexes with the general formulas (II) or (III), $Z^3$ and $Z^4$ can have the following representative formula:

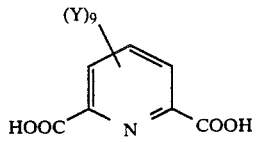

in which q has the definition given above. The following non limitative examples of such mono or poly-aromatic compounds can be cited: pyridine 2,6-dicarboxylic (or dipicolinic) acid, pyrazine 2,6-dicarboxylic acid, isoquinoline 1,3-dicarboxylic acid, pyrimidine 2,4- or 2,6-dicarboxylic acid and the 3-, 4- and 5-chloro, bromo, nitro, hydroxy, methyl, ethyl, propyl, butyl, phenyl and benzyl dipicolinic acids; in the case of the complexes with general formula (III), the following non limitative examples of such mono or poly-aromatic compounds can also be cited: pyridine 2,3-, 2,4- or 2,5-dicarboxylic acid, pyrazine 2,3- or 2,5-dicarboxylic acid, isoquinoline 3,4- or 1,8-dicarboxylic acid, quinoline 2,3-, 2,4- or 2,8-dicarboxylic acid and pyrimidine 4,5- or 5,6-dicarboxylic acid.

In the complexes with the general formulas (I), (II) or (III), L and L, identical or different, are preferably each selected from the group formed by water, an alcohol (such as methanol), a 1,3-diketonic compound (such as acetylacetone), a hydroxy-aromatic compound comprising a ketonic or aldehydic group in ortho of the hydroxy group (such as salicylic aldehyde or orthohydroxyacetophenone), an aromatic amine comprising one or several benzene rings, attached or not, and one or several atoms of nitrogen per ring (such as pyridine, quinoline, acridine, 2-, 3- and 4-picolines, collidine, 4-dimethylaminopyridine, picolinic acid, methyl picolinate, nicotinic acid, isonicotinic acid, N-methylimidazole, 2,2-bipyridine, orthophenanthroline), a linear or cyclic amide, for example with the formula $R^5\text{-CO-NR}^6R^7$ in which $R^5$, $R^6$ and $R^7$, identical or different, represent each an atom of hydrogen or a hydrocarbon radical comprising 1 to 30 atoms of carbon or at least two of these radicals $R^5$, $R^6$ and $R^7$ form together with the atoms to which they are linked a cycle comprising 4 to 30 atoms of carbon (as examples of amide, dimethylformamide, diethylformamide, dimethylacetamide, N,N-dimethylbenzamide, N,N-diethylnicotinamide, N-acetylmorpholine, N-benzoylpiperidine, N-formylpiperidine, N-acetylpiperidine, N-methylpyrrolidone, N-ethylpyrrolidone, N-phenylpyrrolidone, N-methyl-valerolactam, N-methyl-caprolactam, N,N-diethylpicolinamide and N,N-dimethylpicolinamide can be cited), a phosphoramide, for example with the formula $(R^8R^9N)_3PO$ in which $R^8$ and $R^9$, identical or different, represent each a hydrocarbon radical comprising 1 to 30 atoms of carbon (such as hexamethylorthophosphotriamide, hexaethylorthophosphotriamide and octamethylpyrophosphoramide), an aliphatic or aromatic amine oxide (such as trimethylamine oxide, N-methylmorpholine oxide, pyridine oxide, 2-, 3- and 4-picoline oxide, quinoline oxide and 2,2-bipyridine-N oxide), a phosphine, arsine or stibnite oxide (such as triphenylphosphine oxide, triphenylarsine oxide, triphenylstibnite oxide, trimethylphosphine oxide, methyldiphenylphosphine oxide, diethylphenylphosphine oxide and trimorpholinophosphine oxide).

The titanium peroxidic complexes used as condensation catalysts in the present invention can be prepared by any method known by the man skilled in the art for the synthesis of the peroxidic complexes of transition metals. These complexes will for example be obtained by using one of the synthesis processes described by POSTEL et al. (Inorganica Chimica Acta, 1986, Vol. 113, p. 173 and following pages) or by MIMOUN et al. (Inorganic Chemistry, 1982, Vol. 21, p. 1303 and following pages).

An advantageous embodiment of the invention utilizes, with the titanium catalyst, at least one co-catalyst selected from the group formed by the quaternary "onium" salts well-known by the person skilled in the art and corresponding to the following general formula:

$(R^{10} R^{11} R^{12} R^{13} M)^+ X^-$ in which M is an element belonging to the V A (16) group of the periodic table of elements (Handbook of Chemistry and Physics, 68th publishing, 1987–1988) and, preferably, nitrogen or phosphorus; $X^-$ is a stable anion such as, for example, chlorine or bromine and, preferably, chlorine; $R^{10}$, $R^{11}$, $R^{12}$ and $R^{13}$, identical or different, represent each an atom of hydrogen or a hydrocarbon group comprising 1 to 30 atoms of carbon. The following non limitative examples of quaternary "onium" (ammonium and phosphonium) salts can be cited: tetramethylonium, tetraethylonium, tetrapropylonium, tetrabutylonium, tetraphenylonium, tetrabenzylonium, methyltributylonium, methyltriethylonium, methyltriphenylonium, butyltriphenylonium, ethyltriphenylonium, benzyltrimethylonium, benzyltributylonium, benzyltriphenylonium, phenyltrimethylonium, octadecyltrimethylonium, naphtyltrimethylonium, tolyltrimethylonium, dimethyldioctadecylonium, dimethyldihexadecylonium and tricaprylylmethylonium (mixture of $C_8$ and $C_{10}$ with predominance of $C_8$, known as ALIQUAT 336 (R)) bromides and chlorides.

The cyclic anhydride of a dicarboxylic acid which is used in the present invention is preferably a cyclic anhydride of a vicinal saturated or unsaturated dicarboxylic acid.

The cyclic anhydride which is used usually has 4 to 160 atoms of carbon and preferably 4 to 90 atoms of carbon in its molecule.

The following non limitative examples can thus be cited: maleic anhydride, akylmaleic anhydrides (such as for example citraconic anhydride (methylmaleic)), halogeno-maleic anhydrides (such as for example chloro- and bromo-maleic anhydrides), succinic anhydride, alkenylsuccinic anhydrides (such as for example itaconic anhydride (methylene-succinic), n-octadecenylsuccinic anhydride and dodecenylsuccinic anhydride), polyalkenylsuccinic anhydrides with usually an average molecular mass ranging from about 200 to 3,000 and most often from about 250 to 2,000 (such as for example polypropenylsuccinic anhydrides, particularly tetrapropenylsuccinic anhydride, and polyisobutenylsuccinic anhydrides often called PIBSA), phthalic anhydride, phthalic anhydrides substituted by at least one atom of halogen and/or at least one alkyl group, for example an inferior alkyl group with 1 to 4 atoms of carbon, trimellitic anhydride, cyclohexane-dicarboxylic-1,2 anhydride, cyclohexane-dicarboxylic-1,2 anhydrides substituted by at least one atom of halogen and/or at least one alkyl group, for example an inferior alkyl group with 1 to 4 atoms of carbon, nadic anhydride (bicyclo [2,2,1] heptene-5 dicarboxylic-2,3) and the nadic anhydrides substituted by at least one atom of halogen and/or at least one alkyl group, for example an inferior alkyl group with 1 to 4 atoms of carbon. Other examples of a cyclic anhydride of a non-vicinal dicarboxylic acid can also be cited: glutaric anhydride, the glutaric anhydrides substituted by at least one atom of halogen and/or at least one alkyl group, for example an inferior alkyl group with 1 to 4 atoms of carbon, glutaconic anhydride and the glutaconic anhydrides substituted by at least one atom of halogen and/or at least one alkyl group, for example an inferior alkyl group with 1 to 4 atoms of carbon.

The epoxide that is used in the present invention is usually a mono-epoxide compound with the following general formula:

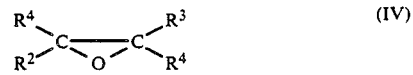
(IV)

in which $R^1$ and $R^3$, identical or different, represent each an atom of hydrogen or an inferior alkyl group with 1 to 4 atoms of carbon such as methyl, ethyl, propyl and butyl; $R^2$ and $R^4$, identical or different, represent each an atom of hydrogen, a hydrocarbon group, possibly substituted by at least one atom of halogen, with 1 to 30 atoms of carbon (such as for example an alkyl group with 1 to 30 atoms of carbon, an alkenyl group with 2 to 30 and most often 3 to 30 atoms of carbon, a cycloaliphatic group with 3 to 30 and most often 5 to 30 atoms of carbon, an aryl group with 6 to 30 atoms of carbon, an aryl-alkyl (aralkyl) group or an akyl-aryl (alkaryl) group with 7 to 30 atoms of carbon or the corresponding groups substituted by at least one atom of halogen), a group with the formula $R^5$-O-$R^6$- in which $R^5$ represents a hydrocarbon group, possibly substituted by at least one atom of halogen, with 1 to 30 atoms of carbon such as for example the hydrocarbon groups described above and $R^6$ represents a bivalent hydrocarbon group with 1 to 30 atoms of carbon such as for example an alkylene group with 1 to 30 atoms of carbon, an alkenylene group with 2 to 30 and most often 4 to 30 atoms of carbon, a cycloalkylene group with 3 to 30 and most often 5 to 30 atoms of carbon or an arylene group with 6 to 30 atoms of carbon; $R^2$ can also represent a group with the formula

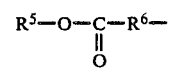

or a group with the formula

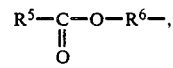

in which $R^5$ and $R^6$ have the definition given above, such as for example an alkoxycarbonylalkylene group or an alkylcarbonyloxyalkylene group; $R^2$ and $R^4$ can also form, together with the atoms of carbon to which they are linked, a saturated or unsaturated cycle with for example 4 to 30 atoms of carbon.

It is also possible to use mixtures of epoxide compounds usually comprising at least 80%, preferably at least 90% and for example at least 95% by mole of mono-epoxide compounds and containing compounds comprising several epoxide groups (oxirane cycles) in their molecule, for example two or three epoxide groups; the proportion by mole of the poly-epoxide compounds in the mixture represents the 100% complement.

The utilized epoxide compound generally comprises 2 to 62 atoms of carbon and preferably 2 to 40 atoms of carbon in its molecule.

The following examples of epoxide compounds can be cited: ethylene oxide, propylene oxide, epoxy-1,2 butane, epoxy-1,2 pentane, epoxy-1,2 hexane, epoxy-1,2 heptane, epoxy-1,2 octane, epoxy-1,2 nonane, epoxy-1,2 decane, epoxy-1,2 undecane, epoxy-1,2 dodecane, epoxy-1,2 tetradecane, epoxy-1,2 pentadecane, epoxy-1,2 hexadecane, epoxy-1,2 heptadecane, epoxy-1,2 octadecane, epoxy-1,2 nonadecane, epoxy-1,2 eicosane, epoxy-1,2 docosane, epoxy-1,2 tetracosane, epoxy-1,2 hexacosane, the epoxide polybutenes with an average molecular mass ($\overline{Mn}$) ranging from about 100 to about 1,000, epoxy-2,3 butane, epoxy-2,3 pentane, epoxy-2,3 hexane, epoxy-3,4 heptane, epoxy-2,3 octane, epoxy-3,4 octane, epoxy-3,4 decane, epoxy-9,10 octadecane, ethoxy-3 epoxy-1,2 propane, propoxy-3 epoxy-1,2 propane, butoxy-3 epoxy-1,2 propane, pentyloxy-3 epoxy-1,2 propane, hexyloxy-3 epoxy-1,2 propane, heptyloxy-3 epoxy-1,2 propane, octyloxy-3 epoxy-1,2 propane, decyloxy-3 epoxy-1,2 propane, dodecyloxy-3 epoxy-1,2 propane, acetoxy-1 epoxy-2,3 propane, butyryloxy-1 epoxy-2,3 propane, lauroyloxy-1 epoxy-2,3 propane, myristoyloxy-3 epoxy-1,2 propane, palmitoyloxy-3 epoxy-1,2 propane, stearoyloxy-3 epoxy-1,2 propane, the alkylic esters, for example the methylic, ethylic, propylic, butylic, ethyl-2 hexylic and hexadecylic esters of the epoxy-3,4 butanoic, epoxy-4,5 pentanoic, epoxy-3,4 nonanoic, epoxy-10,11 undecanoic, epoxy-6,7 octadecanoic, epoxy-12,13 octadecanoic, epoxy-11,12 octadecanoic, epoxy-9,10 octadecanoic, epoxy-11,12 eicosanoic and epoxy-13,14 docosanoic acids, chloro-1 epoxy-2,3 propane, epoxy-2,3 methyl-2 butane, alphapinene oxide (trimethyl-2,7,7 oxa-3 tricyclo [4,1,1,0] octane) and styrene oxide (phenyloxirane).

The following examples of mixtures of epoxide compounds comprising poly-epoxides can be cited: mixture of alkylic esters obtained by esterification of a mixture of epoxy acids resulting from the epoxidation of a mixture of ethylene-unsaturated fat acids.

The mixture of ethylene-unsaturated fat acids is for example a mixture comprising, in proportions by weight given in Table I hereafter, acids (saturated and unsaturated) with 12 to 20 atoms of carbon in their molecule. This mixture is usually called olein.

TABLE I

| ACIDS | $C_{12}$* | $C_{14}$* | $C_{14.1}$ | $C_{15}$* | $C_{16}$* | $C_{16.1}$ | $C_{17.1}$ | $C_{18}$* | $C_{18.1}$ | $C_{18.2}$ | $C_{18.3}$ | $C_{20.1}$ |
|---|---|---|---|---|---|---|---|---|---|---|---|---|
| % by wt. | 0.8 | 2.7 | 1.0 | 0.5 | 5.0 | 5.5 | 1.5 | 1.5 | 68.0 | 10.0 | 2.5 | 1.0 |

*saturated acids

In this table I, $C_{p.1}$ designates acids with one ethylenic unsaturation, $C_{p.2}$ designates acids with 2 ethylenic unsaturations and $C_{p.3}$ designates acids with 3 ethylenic unsaturations (p is the number of atoms of carbon).

For the esterification of the epoxyacid mixture, a mixture of alcohols comprising by weight about 95% of n-hexadecylic alcohol, 3% of n-octadecylic alcohol and 2% of alcohols with more than 18 atoms of carbon in their molecule can for example be used.

The condensation between at least one epoxide and at least one cyclic anhydride of a dicarboxylic acid can be carried out in the presence or in the absence of a solvent. Generally a solvent is preferably utilized, such as for example a hydrocarbon solvent. As non limitative examples of hydrocarbon solvents which can be used, benzene, toluene, xylene, ethylbenzene, cyclohexane, hexane or a mixture of hydrocarbons such as for example a hydrocarbon cut with a high boiling point such as a gas-oil, a kerosine or the SOLVESSO 150 (190°-209° C.) commercial cut containing 99% by weight of aromatic compounds can be cited. It is also possible to utilize mixtures of solvents, for example a mixture of xylenes.

The condensation reaction is usually performed at a temperature of about 30° to about 200° C., preferably about 40° to about 180° C. and for example about 60° to about 150° C. It is generally carried out under a normal pressure or under the pressure generated by the mixture constituents, but it is possible to operate under a higher pressure.

The condensation between the cyclic anhydride and the epoxide is generally achieved by using such an amount of each of both constituents that the epoxide/cyclic anhydride molar ratio ranges from about 0.5:1 to about 2:1, preferably from about 0.7:1 to about 1.3:1 and more preferably from about 0.9:1 to about 1.1:1.

The reaction lasts for about 1 to about 24 hours and for example for about 2 to about 12 hours. This duration is preferably that which corresponds, under the chosen conditions, to the almost total disappearance of one of the reagents (epoxide or anhydride) that were used in the reaction.

The titanium-based catalyst can be added to the epoxide and anhydride mixture in the solid form or in the diluted form (solution or dispersion) in a solvent which is usually the same as that which is utilized for the condensation.

The utilized amount of titanium-based catalyst, expressed in gram-atom of titanium per 100 moles of epoxide, generally ranges from 0.05 to 5% and preferably from 0.1 to 2%. When a co-catalyst is used in association with the peroxidic titanium catalyst, the amount of this co-catalyst, expressed in percent by mole in relation to the amount in moles of epoxide utilized in the reaction, usually ranges from 0.01 to 5%, most often from 0.05 to 5% and preferably from 0.1 to 2%. The ratio of gram-atom of titanium to molar amount of co-catalyst generally ranges from 5:1 to 0.2:1, most often from 2:1 to 0.5:1 and preferably from 1.4:1 to 0.7:1. The amount of co-catalyst is preferably of the same order as the amount of titanium-based catalyst.

The polyester from the condensation according to the invention is a compound which usually has an average molecular mass of about 400 to 50,000 and the units of which, stemming from the epoxide and the anhydride, are regularly alternate. Besides, the use of titanium peroxidic complexes of the peroxo type allows to reduce very widely the homopolymerisation of the epoxide in relation to that which is obtained by using butyl titanate, while preserving a high reaction velocity, which also allows to obtain, in isoconditions, a relatively high conversion of the original materials, as shown in the following examples.

BRIEF DESCRIPTION OF THE DRAWINGS

FIGS. 1-8 illustrate the percentage of conversion plotted against time in hours for each reactant. The figures are described in the Examples.

These examples illustrate the invention without limiting the scope thereof. Examples 6, 8, 9 and 11 are given as a comparison.

EXAMPLE 1

14.7 g (0.15 mole) of maleic anhydride, 27.6 (0.15 mole) of epoxy-1,2 dodecane, 7.4 g of phenyldodecane, 17.6 g of toluene and 0.55 g of a titanium complex with the following formula (I)

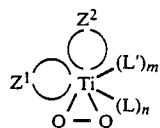  (I)

are introduced into a 250 ml-reactor equipped with a stirring system and a temperature regulation system.

In the previous formula (I), $m=n=0$ and $Z^1$ and $Z^2$, identical, represent each the hydroxy-8 quinoline. This complex corresponds to the compound number 4 described by MIMOUN et al cited above (Inorganic Chemistry, 1982, Vol. 21, p. 1303 and following pages). The mixture is brought to 100° C. and maintained at this temperature for 6 hours under constant stirring. The reaction is followed by infrared and by Gel Permeation Chromatography (GPC). With the infrared, the appearing of an ester band at 1,730 cm$^{-1}$ and the disappearing of the anhydride carbonyl bands at 1,770 cm$^{-1}$ and 1,840 cm$^{-1}$ can be observed. FIG. 1 shows the conversion percentage for each constituent in relation to time in hour (GPC measurement; the phenyldodecane that is present in the reaction medium is used as an internal standard). Curve A relates to the maleic anhydride and curve B to the epoxy-1,2 dodecane. After a 6 hour-reaction at 100° C., the epoxide conversion rate is 96% and that of the maleic anhydride is 90%. The average molecular mass of the obtained polyester, in relation to a polystyrene calibration, is 6,810. FIG. 1 shows that the epoxide and anhydride conversions are substantially equal at any time, particularly during the first 4 hours of the reaction, which allows to conclude that the formed polymer is perfectly alternate. The homopolymerisation of epoxide is low: it is under 10% after the 6 hour-reaction.

EXAMPLE 2

It is carried out under the same conditions as in example 1, but the temperature is maintained at 80° C. and a titanium complex with formula (I), where $Z^1$ and $Z^2$, identical, represent each picolinic acid ($m=0$ and $n=1$) and L represents hexamethylorthophosphotriamide, is used. 0.75 g ($1.5 \times 10^{-3}$ gram-atom of titanium) of this complex is introduced into the reaction mixture.

This complex corresponds to the compound number 1 described by MIMOUN et al cited above. After a 6 hour-reaction at 80° C., the conversion rate of the maleic anhydride is 64% and that of the epoxide is 66%.

The average molecular mass of the obtained polyester, measured in relation to a polystyrene calibration, is 3,623. FIG. 2 shows the conversion percentage of each constituent in relation to time (in hour). Curve A relates to maleic anhydride and curve B to epoxy-1,2 dodecane.

EXAMPLE 3

Example 2 is repeated, but the temperature is maintained at 100° C. After a 6 hour-reaction at 100° C., the epoxide conversion rate is 96% and that of the maleic anhydride is 92%.

EXAMPLE 4

It is carried out in the same conditions as in example 1, but a titanium complex with formula (II)

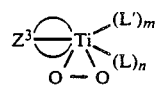  (II)

is used, in which $Z^3$ represents the pyridine 2,6-dicarboxylic acid, $m=1$, $n=1$ and L and L' represent water. After a 6 hour-reaction at 100° C., the conversion rate of the maleic anhydride is 84% and that of the epoxide is 88%.

EXAMPLE 5

It is carried out in the same conditions as in example 1, but a titanium complex with formula (III)

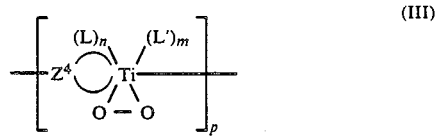  (III)

is used, in which $m=1$, $n=1$, $p=5$, $Z^4$ represents pyridine 2,5-dicarboxylic acid, L represents hexamethylorthophosphotriamide and L' represents water. After a 6 hour-reaction at 100° C., the conversion rate of the maleic anhydride is 62% and that of the epoxide is 66%.

EXAMPLE 6 (COMPARISON)

It is carried out in the same conditions as in example 2, but 0.92 ml of a solution in toluene, of 50% by weight of butyl titanate with the formula Ti (OC$_4$ H$_9$)$_4$ ($1.5 \times 10^{-3}$ gram-atom of titanium), is introduced into the reaction mixture as a titanium-based catalyst.

FIG. 3 shows the conversion percentage for each constituent in relation to time (in hour). Curve A relates to the maleic anhydride and curve B relates to the epoxy-1,2 dodecane. After a 6 hour-reaction at 80° C., the epoxide conversion rate is 100% and that of the maleic anhydride is 74%. It can be seen on FIG. 3 that the conversion of the epoxide is much faster than that of the maleic anhydride as soon as the reaction begins. The obtained polymer is not a perfectly alternate polymer. The homopolymerisation of the epoxide is rather high and it widely exceeds 20% after the 6 hours of reaction at 80° C.

EXAMPLE 7

It is carried out in the same conditions as in example 3, but the maleic anhydride is replaced by 22.2 g (0.15 mole) of phthalic anhydride. 0.9 g of dimethyldioctadecylammonium chloride ($1.5 \times 10^{-3}$ mole) is also added to the reaction medium. After a 6 hour-reaction at 100° C., the conversion rate of the phthalic anhydride is 96% and that of the epoxide is 96%.

FIG. 4 shows the conversion percentage for each constituent in relation to time (in hour). Curve A relates to the phthalic anhydride and curve B to the epoxy-1,2 dodecane.

EXAMPLE 8 (COMPARISON)

It is carried out in the same conditions as in example 2, but the titanium-based catalyst that is utilized is titanyl bis(acetylacetonate) with the formula TiO (C$_5$ H$_7$ O$_2$)$_2$.

FIG. 5 shows the conversion percentage for each constituent in relation to time (in hour). Curve A relates to the maleic anhydride and curve B to the epoxy-1,2 dodecane. After a 6 hour-reaction at 80° C., the conversion rate of the epoxide is 21% and that of the maleic anhydride is 13%.

The obtained conversions are very widely lower than those obtained with the process according to the present invention (see especially the results obtained in example 2).

EXAMPLE 9 (COMPARISON)

It is carried out in the same conditions as in example 2, but the titanium-based catalyst that is used is titanyl bis(hydroxy-8 quinoline) with the formula TiO($C_9H_6NO$)$_2$.

FIG. 6 shows the conversion percentage for each constituent in relation to time (in hour). Curve A relates to the maleic anhydride and curve B to the epoxy-1,2 dodecane. After a 6 hour-reaction at 80° C., the conversion rate of the epoxide is 30% and that of the maleic anhydride is 27%.

The obtained conversions are very widely lower than those obtained with the process according to the present invention (see especially the results obtained in example 2).

EXAMPLE 10

Example 2 is repeated, but 0.35 g of the same titanium complex is used and 0.45 g of dimethyldioctadecylammonium chloride is added to the reaction mixture. The temperature is maintained at 100° C. After a 6 hour-reaction at 100° C., the conversion rate of the epoxide is 99% and that of the maleic anhydride is 98%.

FIG. 7 shows the conversion percentage for each constituent in relation to time (in hour). Curve A relates to the maleic anhydride and curve B to the epoxy-1,2 dodecane.

EXAMPLE 11 (COMPARISON)

Example 10 is repeated, but no titanium complex is utilized and 0.9 g (instead of 0.45 g) of dimethyldioctadecylammonium chloride is added to the reaction mixture. After a 6 hour-reaction at 100° C., the conversion rate of the epoxide is 70% and that of the maleic anhydride is 90%. In this case, a relatively considerable disappearance of maleic anhydride can be noticed from the beginning of the reaction, together with a strongly marked blackening of the reaction medium. FIG. 8 shows the conversion percentage for each constituent in relation to time (in hour). Curve A relates to the maleic anhydride and curve B to the epoxy-1,2 dodecane. It can be seen on this figure that the maleic anhydride is consumed more rapidly than the epoxide as soon as the reaction begins.

The obtained polymer is not a perfectly alternate polymer. Numerous reaction by-products form through the degradation of the maleic anhydride in the presence of the quaternary ammonium compound, which causes the observed blackening.

EXAMPLE 12

Example 3 is repeated, but the epoxide compound that is used is ethyl-2 hexylic ester of epoxy-9,10 octadecanoic acid.

After a 6 hour-reaction at 100° C., the conversion rate of the epoxide is 60% and that of the maleic anhydride is 57%.

We claim:

1. A process comprising condensing at least one epoxide with at least one cyclic anhydride of a dicarboxylic acid in the presence of a catalyst corresponding to one of the following general formulas:

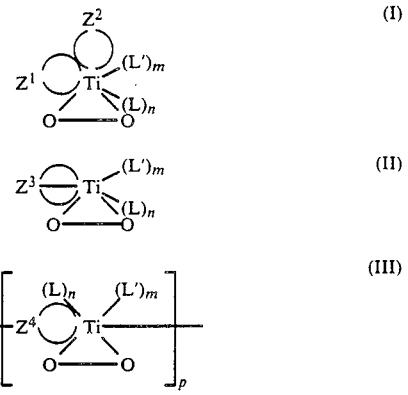

in which n and m are, independently from one another, zero or one, p is a number which is greater than or equal to 2, $Z^1$ and $Z^2$, identical or different, represent each an anion or a bidentate mono-anionic group, $Z^3$ represents a di-anion or a tri- or tetradentate di-anionic group, $Z^4$ represents a bi- or tridentate di-anionic group, L and L', identical or different, represent each a molecule of water, an alcohol or a monodentate or a bidentate electrodonor-type ligand.

2. A process according to claim 1 wherein said titanium peroxidic complex corresponds to one of the following general formulas (I), (II) and (III) in which:

$Z^1$ and $Z^2$, identical or different, are each selected from the group formed by the nitrogenated heterocyclic mono or poly-aromatic compounds, having at least one carboxylic group vicinal to nitrogen, substituted or not by at least one Y group selected from the group formed by an alkyl, aryl, alkyloxy-, aryloxy-, nitro-, carboxylate, carboxyamide, hydroxyl and halogen group, hydroxy-5 or -8 quinoxaline, hydroxy-8 quinazoline, hydroxy-8 cinnoline, hydroxy-4 or -5 acridine, hydroxy-1, -4, -6 or -9 phenazine and the derivatives of these nitrogenated heterocyclic hydroxyl compounds substituted by at least one T group selected from the group formed by an alkyl, aryl, alkyloxy-, aryloxy-, nitro-, carboxylate, carboxyamide and halogen group;

$Z^3$ and $Z^4$, identical or different, are each a nitrogenated heterocyclic mono or poly-aromatic compound, having at least two carboxylic groups among which at least one is vicinal to an atom of nitrogen, substituted or not by at least one Y group as defined above;

L and L', identical or different, represent each a molecule of water, an alcohol or a ligand selected from the group formed by an aromatic amine, a linear or cyclic amide, a phosphoramide, an aliphatic or aromatic amine oxide, a phosphine, arsine or stibnite oxide, a 1,3-diketonic compound and a hydroxy-aromatic compound comprising a ketonic or an aldehydic group in ortho of the hydroxyl group.

3. A process according to claim 1 wherein said titanium peroxidic complex corresponds to the general formula (I) in which $Z^1$ and $Z^2$, identical or different, represent each a compound selected from the group formed by picolinic acid, pirazine 2- or 6-carboxylic acid, quinoline 2-carboxylic acid, isoquinoline 1- or 3-carboxylic acid, the 3-, 4-, 5- and 6-chloro, bromo, nitro, hydroxy, methyl, ethyl, propyl, butyl, phenyl and benzyl picolinic acids and hydroxy-8 quinoline.

4. A process according to claim 1 wherein said titanium peroxidic complex corresponds to the general formula (II) in which $Z^3$ is selected from the group formed by pyridine 2,6-dicarboxylic acid, pyrazine 2,6-dicarboxylic acid, isoquinoline 1,3-dicarboxylic acid, pyrimidine 2,4- or 2,6-dicarboxylic acid and the 3-, 4- and 5-chloro, bromo, nitro, hydroxy, methyl, ethyl, propyl, butyl, phenyl and benzyl dipicolinic acids.

5. A process according to claim 1 wherein said titanium peroxidic complex corresponds to the general formula (III) in which $Z^4$ is selected from the group formed by pyridine 2,3-, 2,4-, 2,5- or 2,6-dicarboxylic acid, pyrazine 2,3-, 2,5- or 2,6-dicarboxylic acid, isoquinoline 1,3-, 3,4- or 1,8-dicarboxylic acid, quinoline 2,3-, 2,4- or 2,8-dicarboxylic acid, pyrimidine 2,4-, 2,6-, 4,5- or 5,6-dicarboxylic acid and the 3-, 4- and 5-chloro, bromo, nitro, hydroxy, methyl, ethyl, propyl, butyl, phenyl and benzyl dipicolinic acids.

6. A process according to claim 1 wherein said titanium peroxidic complex corresponds to one of the general formulas (I), (II) or (III) in which L and L', identical or different, represent each a compound selected from the group formed by water, methanol, acetylacetone, salicylic aldehyde, orthohydroxyacetophenone, pyridine, quinoline, acridine, 2-, 3- and 4-picolines, collidine, 4-dimethylaminopyridine, picolinic acid, methyl picolinate, nicotinic acid, isonicotinic acid, N-methylimidazol, 2,2'-bipyridine, orthophenantroline, dimethylformamide, diethylformamide, dimethylacetamide, N,N-dimethylbenzamide, N,N-diethylnicotinamide, N-acetyl-morpholine, N-benzoylpiperidine, N-formylpiperidine, N-acetylpiperidine, N-methylpyrrolidone, N-ethylpyrrolidone, N-phenylpyrrolidone, N-methylvalerolactame, N-methylcaprolactame, N,N-diethylpicolinamide, N,N-dimethylpicolinamide, hexamethylorthophosphotriamide, hexaethylorthophosphotriamide, octamethylpyrophosphoramide, trimethylamine oxide, N-methylmorpholine oxide, pyridine oxide, 2-, 3- and 4-picolines oxide, quinoline oxide, 2,2'-bipyridine-N oxide, triphenylphosphine oxide, triphenylarsine oxide, triphenylstibnite oxide, trimethylphosphine oxide, methyldiphenylphosphine oxide, diethylphenylphosphine oxide and trimorpholinophosphine oxide.

7. A process according to claim 1 wherein at least one co-catalyst is also used, selected from the group formed by quaternary ammonium and/or phosphonium salts with the general formula $(R^{10} R^{11} R^{12} R^{13} M)^+ X^-$ in which M represents nitrogen or phosphorus, $X^-$ represents a chlorine or a bromine anion, and $R^{10}$, $R^{11}$, $R^{12}$ and $R^{13}$, identical or different, represent each an atom of hydrogen or a hydrocarbon group comprising 1 to 30 atoms of carbon.

8. A process according to claim 1, comprising for condensing at least one epoxide on at least one cyclic anhydride of a saturated or unsaturated vicinal dicarboxylic acid.

9. A process according to claim 8 wherein the cyclic anhydride is selected from the group formed by maleic anhydride, citraconic anhydride, halogenomaleic anhydrides, succinic anhydride, alkenylsuccinic or polyalkenylsuccinic anhydrides, phthalic anhydride, phthalic anhydrides substituted by at least one atom of halogen and/or at least one alkyl group, trimellitic anhydride, cyclohexanedicarboxylic-1,2 anhydride, cyclohexanedicarboxylic-1,2 anhydrides substituted by at least one atom of halogen and/or at least one alkyl group, nadic anhydride, nadic anhydrides substituted by at least one atom of halogen and/or at least one alkyl group, glutaric anhydride, glutaric anhydrides substituted by at least one atom of halogen and/or at least one alkyl group, glutaconic anhydride and glutaconic anhydrides substituted by at least one atom of halogen and/or at least one alkyl group.

10. A process according to claim 1, comprising condensing on at least one cyclic anhydride of a dicarboxylic acid at least one epoxide corresponding to the following general formula:

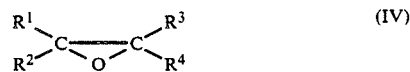

in which $R^1$ and $R^3$, identical or different, represent each an atom of hydrogen or an inferior alkyl group with 1 to 4 atoms of carbon, $R^2$ and $R^4$, identical or different, represent each an atom of hydrogen, a hydrocarbon group, substituted or not by at least one atom of halogen, with 1 to 30 atoms of carbon, a group with the formula $R^5$-O-$R^6$- in which $R^5$ represents a hydrocarbon group, substituted or not by at least one atom of halogen, with 1 to 30 atoms of carbon, and $R^6$ represents a bivalent hydrocarbon group with 1 to 30 atoms of carbon, $R^2$ can also represent a group with the formula

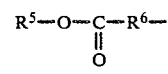

or a group with the formula

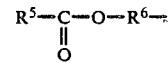

in which $R^5$ and $R^6$ have the definition given above, $R^2$ and $R^4$ can also form together with the atoms of carbon to which they are linked a saturated or unsaturated cycle with 4 to 30 atoms of carbon.

* * * * *